US007334054B2

(12) United States Patent
Anderson

(10) Patent No.: US 7,334,054 B2
(45) Date of Patent: Feb. 19, 2008

(54) VIDEO DETECTION USING DISPLAY DATA CHANNEL

(75) Inventor: David D. Anderson, McCook Lake, SD (US)

(73) Assignee: Gateway Inc., Irvine, CA (US)

( * ) Notice: Subject to any disclaimer, the term of this patent is extended or adjusted under 35 U.S.C. 154(b) by 586 days.

(21) Appl. No.: 10/850,208

(22) Filed: May 20, 2004

(65) Prior Publication Data

US 2004/0233188 A1 Nov. 25, 2004

Related U.S. Application Data

(60) Provisional application No. 60/472,197, filed on May 21, 2003.

(51) Int. Cl.
*G06F 3/00* (2006.01)

(52) U.S. Cl. .......................................... 710/15; 345/1.2

(58) Field of Classification Search ................. 345/3.1, 345/204, 1.1, 1.2; 710/15
See application file for complete search history.

(56) References Cited

U.S. PATENT DOCUMENTS

| | | | | |
|---|---|---|---|---|
| 5,448,697 | A | 9/1995 | Parks et al. | |
| 6,323,828 | B1 | 11/2001 | Perez | |
| 6,329,983 | B1 | 12/2001 | Wang | |
| 6,346,927 | B1 | 2/2002 | Tran et al. | |
| 6,847,335 | B1 * | 1/2005 | Chang et al. | 345/3.1 |
| 6,864,859 | B1 * | 3/2005 | Ho | 345/1.1 |
| 2002/0149541 | A1 * | 10/2002 | Shin | 345/3.1 |

* cited by examiner

*Primary Examiner*—Amr A. Awad
*Assistant Examiner*—Yong Sim
(74) *Attorney, Agent, or Firm*—Scott Charles Richardson; The Brevetto Law Group, PLLC

(57) ABSTRACT

A method and apparatus are provided for detecting a connection associated with a display and a system having a first and second video output port. Data channel information associated with the first video output port and the second video output port are read using DDC instructions and the absence of a connection between the display and the first video output port is detected. Information associated with the absence of the connection is transferred to the display which is connected to the second video output port such that the transferred information associated with the absence of the connection can be displayed to a user in the form of an error message.

24 Claims, 4 Drawing Sheets

VIDEO DETECTION USING DISPLAY DATA CHANNEL

CROSS REFERENCE TO RELATED APPLICATIONS

The present invention is related to, and claims priority from U.S. Provisional Application Ser. No. 60/472,197 filed May 21, 2003, the contents of which are incorporated herein by reference.

BACKGROUND OF THE INVENTION

1. Field of the Invention

The present invention relates to connectors associated with video output, and more specifically to detecting the improper connection of a video monitor to another device having multiple video subsystems.

2. Brief Description of the Related Art

When a conventional system is equipped with multiple video subsystems, users can have difficulty identifying the proper video output from the device to use to establish communication between the device and the monitor. As a result, video monitors can be improperly connected resulting in a "No Video" condition. Lack of video can be particularly troublesome since the absence of video makes it difficult for the user to obtain information regarding the correct connection through the normal information channel, e.g. the video display. More specifically, when a personal computer is equipped with a video graphics array (VGA) port on the computer motherboard and a VGA port on a graphics card, a monitor can be connected to either port. If the monitor is connected to the inactive VGA port, the no information will be displayed. While display information is not normally readily available to a user during start-up, and would be useless if the monitor were connected to the inactive output as described above, some information about display configuration is stored on the system, for example, in the video graphics adapter (VGA) basic input/output system (BIOS).

A VGA BIOS is term referring to a library of functions providing a basic interface to a VGA adapter stored in a non-volatile memory such as a ROM located on an exemplary motherboard, VGA adapter board, or graphics board. The BIOS functions are well established and documented such that most applications and operating systems use the BIOS routines for basic screen I/O. Applications and systems software that directly address video memory can call BIOS routines to initialize state of the VGA.

Early ROM BIOS contained a set of functions for screen I/O on both the Color Graphics Adapter (CGA) and the Monochrome Display Adapter (MDA) until the introduction of the Enhanced Graphics Adapter (EGA) in 1985, and the Video Graphics Array (VGA) in 1987. As adapters have evolved in capability and speed, more BIOS functions have been developed and added to the BIOS.

More recently, the Video Electronics Standards Association (VESA) has defined a set of extensions to the display related routines in the standard BIOS. It should be noted that since the release of the original standard, two major revisions have been released: VBE 2.0—ratified in 1994, and VBE 3.0—ratified in 1998. New features include virtual screen areas and a linear frame buffer. VESA has also defined methods for obtaining information about and controlling the monitor resulting in new corresponding BIOS functions including Display Power Management Signaling [DPMS] and Display Data Channel [DDC]. VBE/DDC for example, allows information about the display to be obtained during a query such as a message sent to the display resulting in the display filling in information in a data structure. The new functions are expected to be included in new releases of the VGA BIOS ROM. Some systems, such as that described in U.S. Pat. No. 6,323,828 B1 issued on Nov. 27, 2001 to Perez, allow for testing of a monitor using the DDC and EDID commands. Earlier systems, such as that described in U.S. Pat. No. 5,448,697 issued on Sep. 5, 1995 to Parks et al., describe the ability to exchange information between a system unit and a display unit using a bidirectional communication channel established therebetween.

Many systems are available for certain types of video detection such as manual detection using switches and the like. In U.S. Pat. No. 6,329,983 B1 issued on Dec. 11, 2001 to Wang for example, a microswitch state is used to detect which of an S and an AV video output are being used. Such a manual method is limited however in that use of a switch involves additional components and is subject to failure. Further, Wang fails to describe when the signal associated with the microswitch can be read and thus a computer system in which the microswitch is used may be required to complete boot up in order to detect the video output.

Other systems such as that described in U.S. Pat. No. 6,346,927 B1 issued on Feb. 12, 2002 to Tran et al., are capable of detecting from which external video input a monitor is being driven based on detection of a sync signal generated by the video adapter.

None of these systems however addresses the need to intelligently determine video parameters such as the active video port and to which output the monitor is plugged. It would be desirable in the art therefore to provide a method and apparatus for resolving problems associated with improper video connection by detecting, for example, to which port a video monitor is connected without the use of switches or the like.

SUMMARY OF THE INVENTION

Accordingly, a method and apparatus are provided for detecting a connection such as an improper connection of a video monitor. A computer system in accordance with various exemplary embodiments, may use the BIOS for detecting to which of more than one video graphics array (VGA) port a display, monitor, or the like is connected based on DDC information in accordance with VBE/DDC functions. The invention allows a video graphics port which was not intended to be used, to be initialized when a connection between the display and the port is detected. Thus on computer systems or on devices having multiple VGA ports, video may be provided from any of the multiple video ports automatically with no input from a user. The possibility of incorrect setup by the user is, therefore, reduced.

Thus in accordance with various exemplary embodiments, an exemplary method for detecting a connection associated with a display and a computer system having a first video output port and a second video output port involves reading information over a data channel such as the DDC, the information associated with, for example, the first video output port and the second video output port. The information preferably includes information about any display connected to the port and may be returned in, for example, an EDID data structure passed with a VBE/DDC read instruction. Through the information an absence of a connection between the display and, for example, the first video output port may be detected. The information associated with the absence of the connection may be transferred to the display connected to the second video output port. The information may be in the form of, for example, a message so as to display the transferred information associated with the absence of the connection as an error message or the like so a user can either accept the connection of the display to the second video output port or change the display connection to the first video output port.

It should be noted that the data channel preferably includes a data channel compliant with VBE/DDC, and as noted above, the information can be obtained about any display devices connected to the video output ports using an EDID read command sent to each of the video output ports. The absence of the connection is preferably detected through the EDID read command, e.g. the issuance of the EDID read command or instruction to the ports did not result in the EDID data structure sent with the command or instruction being filled with information associated with the display, for example, from the first video output port.

In accordance with still other embodiments, an exemplary apparatus for detecting a connection associated with a display and a system having at least a first video output port and a second video output port capable of communicating with the display over a data channel, and a BIOS memory, preferably includes a processor. The processor is coupled to the BIOS memory and the first and second video output ports and a memory for storing instructions such as computer instructions. The processor, by executing the instructions, may load additional display related instructions from, for example, the BIOS memory and execute the display related instructions. It should be noted that the display related instructions preferably cause the processor to read information over the data channel associated with the first and second video output port, e.g. such that respective EDID data structures may be filled with information associated with any respective displays or monitors connected to the ports. The absence of a connection between the display and the first video output port may be detected based on the information. The information associated with the absence of the connection may further be transferred to the display which is connected to the second video output port, so as to display the transferred information associated with the absence of the connection as, for example, an error message or the like. As noted above, the data channel includes a DDC and the display related instructions include VBE instructions as would be appreciated by one of ordinary skill. The processor, in reading the data channel information may send an EDID read command to each of the first video output port and the second video output ports. The processor, in detecting the absence of the connection, may detect that the EDID read command did not result in EDID information associated with the display from the first video output port, e.g. the EDID data structure was not filled with display information.

In accordance with still other embodiments, an article of manufacture is provided consisting of a computer readable medium such as an optical disk, a floppy disk, a a network, a Read Only Memory (ROM), or the like. The computer readable medium preferably carries instructions capable of being read by a processor in a computer system having a display, a first and second video output port capable of communicating with the display over a data channel. The instructions, for example when executed, cause the processor to load display related instructions from a BIOS memory associated with the computer system. The display related instructions when executed further cause the processor to read information such as display information over the data channel associated with the first and second video output port. The absence of a connection between the display and the first video output port can be detected based on the information and the information associated with the absence of the connection may be transferred to the display which is connected to the second video output port so as to display the transferred information associated with the absence of the connection. As noted above, the data channel includes a DDC and the display related instructions include VBE instructions. The instructions, in causing the processor to read the data channel information can further cause the processor to send, for example, an EDID read command to each of the first and second video output ports. The instructions, in causing the processor to detect the absence of the connection further cause the processor to detect that the EDID read command did not result in EDID information associated with the display from the first video output port, e.g. the EDID data structure was not filled with display information.

It should be noted that the exemplary VBE/DDC interface allows operating system software as well as application software to retrieve the display identity information from the display device without specific hardware knowledge or direct hardware access. The hardware protocol for retrieving the identity from the display is described in the VESA Standard Enhanced DDC VBE Sub-function 15h—Display Identification Extensions including Report VBE/DDC Capabilities, Read EDID, and the like as will be described further herein below.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Accordingly, the present invention in accordance with various exemplary embodiments, is directed to a method and apparatus for detecting which video output port a monitor is connected to based on DDC information obtained from VBE instructions loaded using a BIOS in a system having more than one video output. Accordingly video may be provided to the display or monitor from either port is used on a computer system with no input from the user, reducing the possibility of incorrect setup by the user.

Figure 1:
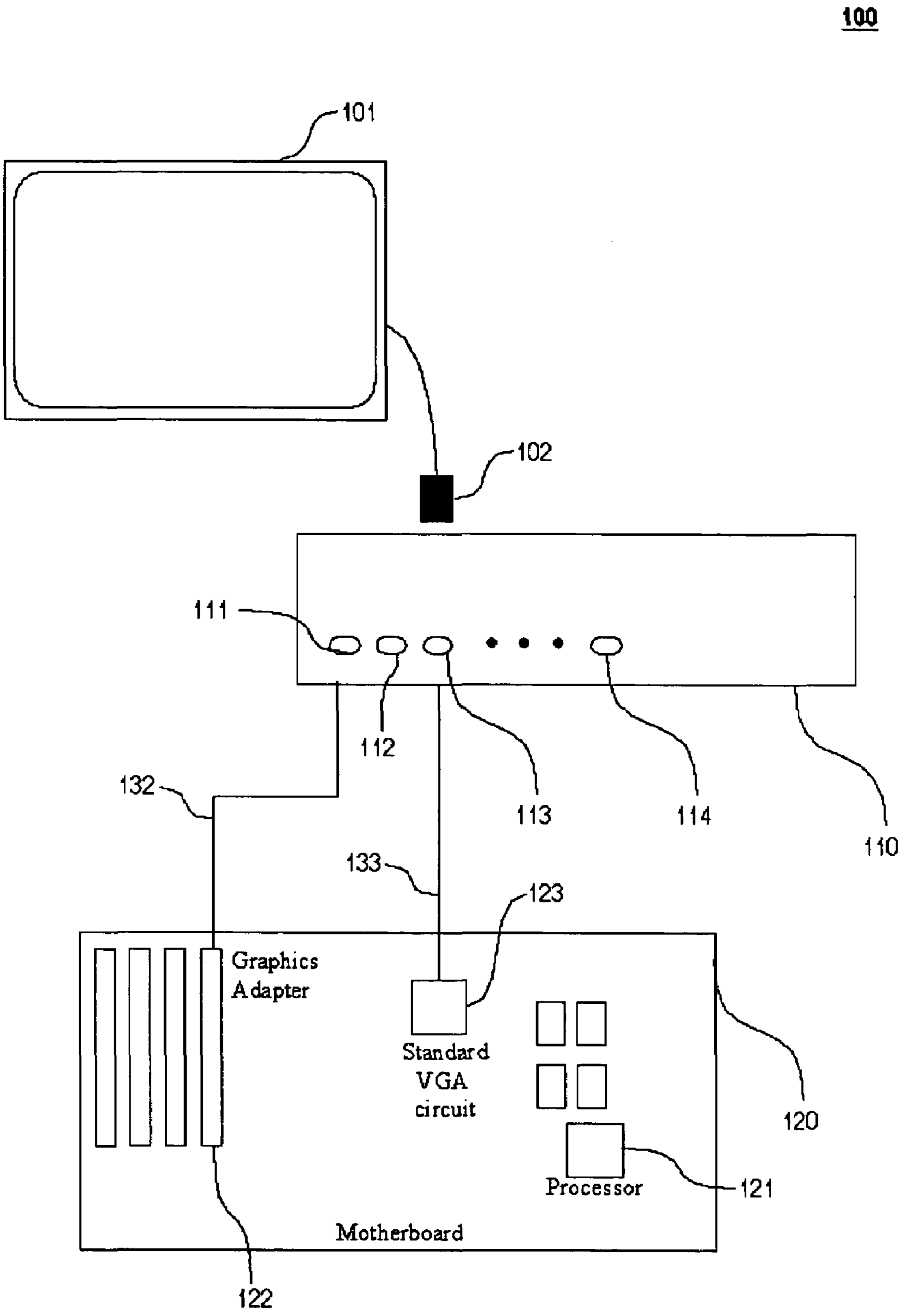
FIG. 1 is a diagram illustrating assemblies associated with an exemplary connection between a display and a computer system having more than one video output port.

Exemplary scenario 100, shown in FIG. 1, includes display 101, computer system 110, shown from a rear view, or a connection panel view, and mother board 120. While the components shown are typical in a conventional computer system, one of ordinary skill in the art will appreciate that various departures from the basic components may be possible without departing from the scope of the invention. Display 101 may be equipped with a cable and connector 102 for coupling video signals and channels from computer system 110 and mother board 120 to display 101. It will be appreciated that connector 102 may be a standard D-type video connector as is commonly used in the art. Likewise, connectors 11, 112, 113, and 114 may also be D-type connectors for mating with connector 102 or connectors from other display devices.

Motherboard 120 may be further equipped with processor 121, graphics board 122, and VGA circuit 123. Graphics board 122, and VGA circuit 123 may be coupled to connector 111 and 113, for example, with connections 132 and 133 respectively, which may be cables, printed circuit traces, or the like as would be appreciated by one of ordinary skill to carry signals, power, and the like from motherboard 120 to the connection panel of computer system 110 and, in particular, to connectors 111 and 113 as noted.

Figure 2:
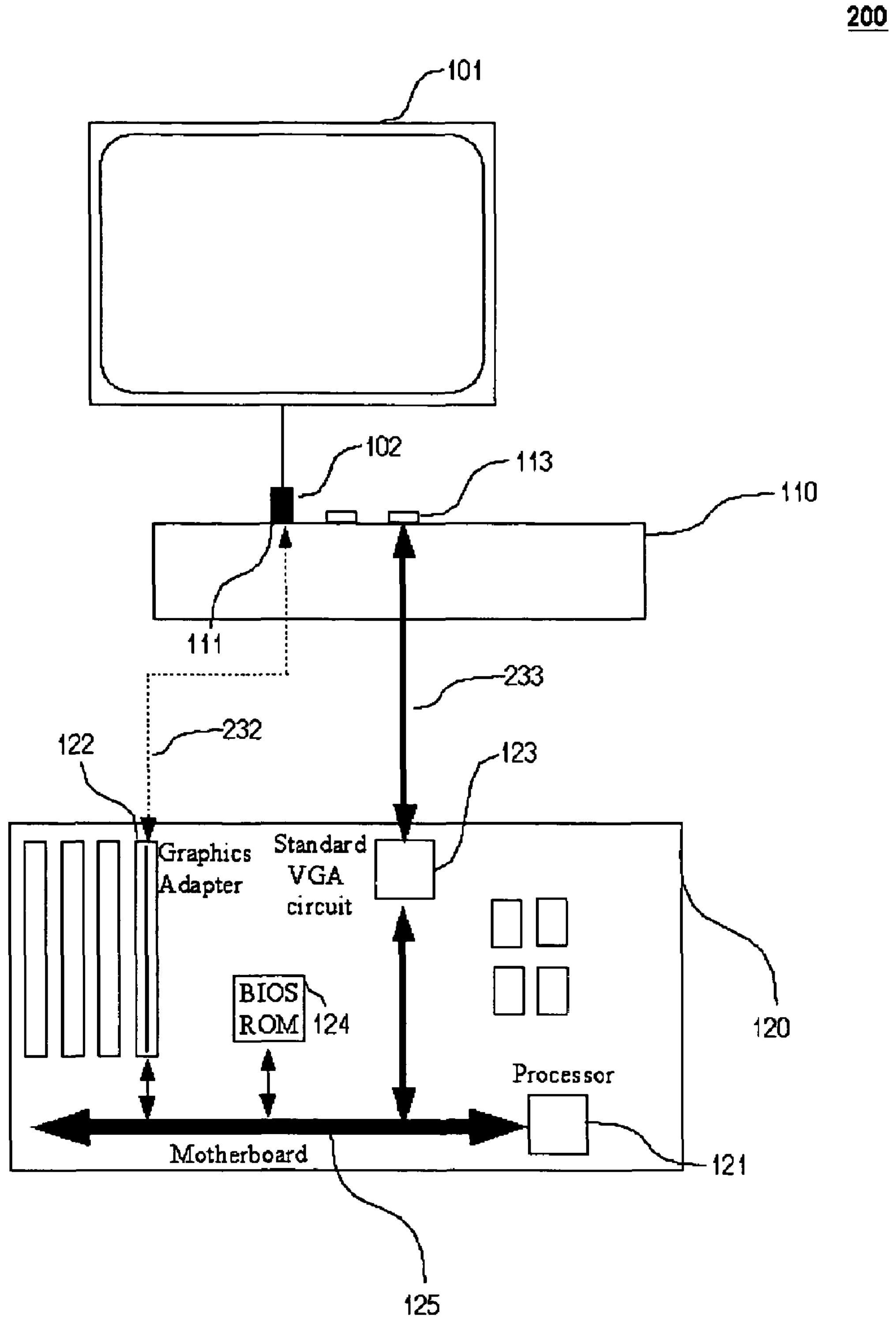
FIG. 2 is a diagram illustrating the assemblies of FIG. 1, and various exemplary data paths for information reading and transfer in accordance with various exemplary embodiments.

Exemplary scenario 200 in FIG. 2 further illustrates the system shown in FIG. 1. Connector 102 of display 101 can be seen as being plugged into connection 111 of computer system 110 and no display is plugged into connector 113. It will be appreciated that in the event standard VGA circuit 123 is designated as the standard, default, or normally configured display driver for computer system 110, as set, for example, in BIOS ROM 124, display 101 will be connected to an inactive port, e.g. a port associated with graphics adapter 122. It will be difficult, under conventional operation, to notify a user of the problem since no video signals will be fed to display 101 on the inactive video port. Thus, in accordance with various exemplary embodiments, BIOS ROM 124, may further contain VBE/DDC instructions which can be loaded, for example during boot up or the like, by processor 121, and executed such that queries or commands may be sent, for example on channels 232 and 233 respectively to any devices which may be connected to computer system 110 using connectors 111-114. In exemplary scenario 200, since display 101 is clearly connected, albeit erroneously, to connector 111, DDC commands will result in data associated with display 101 being associated with graphics adapter 122 rather than standard VGA circuit 123. Since no display is connected to connector 113 associated with, for example, standard VGA circuit 123, then no data will be obtained in association with standard VGA circuit 123 indicated that either no display is connected or the display is incompatible, undefined or inoperative.

Figure 3:
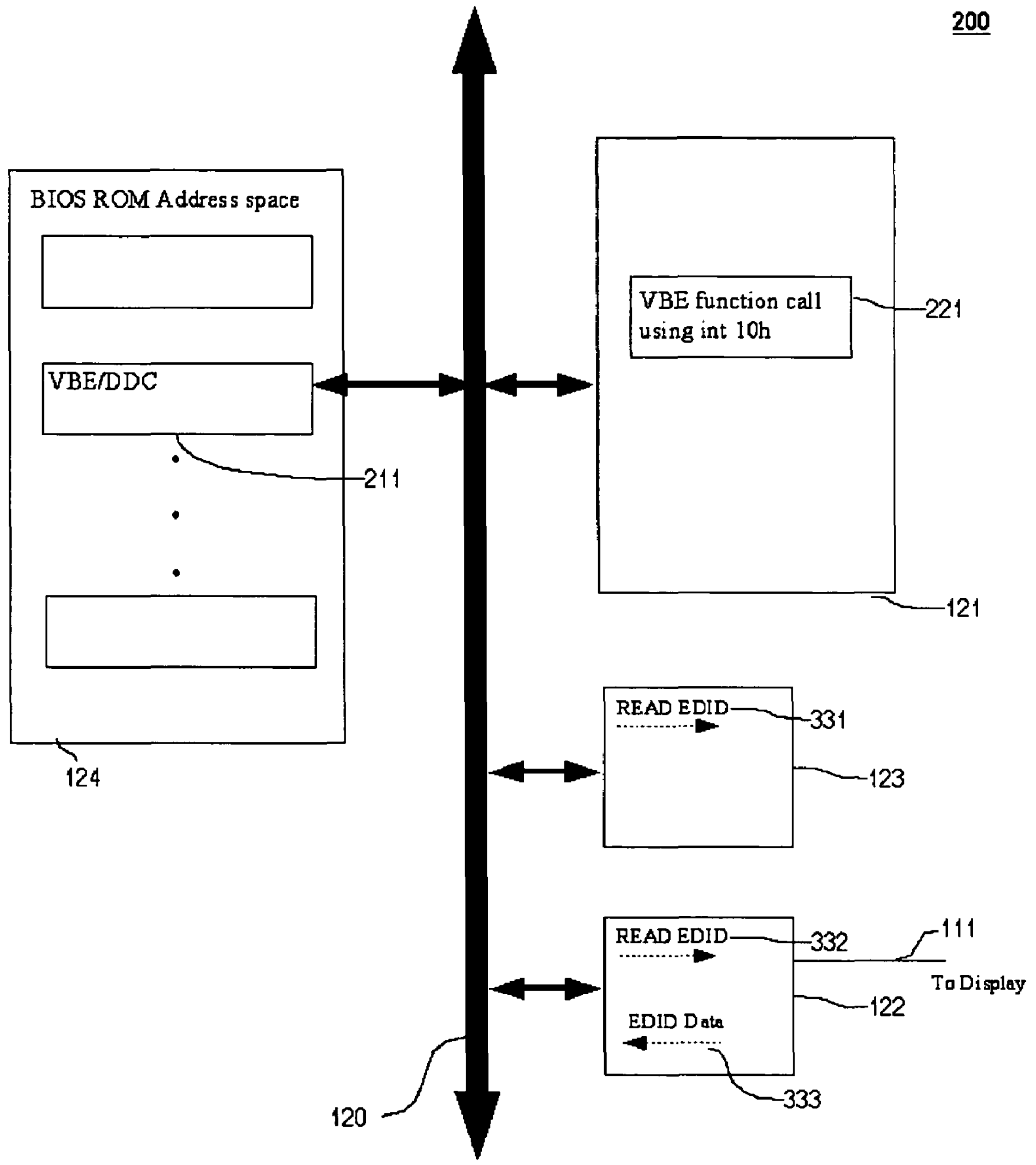
FIG. 3 is a diagram further illustrating various exemplary data paths for instruction loading, display related instruction loading, information reading and transfer using a processor in accordance with various exemplary embodiments.

To better understand the operation of computer system 110, exemplary scenario 300 is provided to illustrate, as shown in FIG. 3, the execution of VBE commands. During boot up, computer system 110, through the operation of processor 121, will perform a variety of functions as will be understood by one of ordinary skill in the art, including loading BIOS information, for example from BIOS 124. BIOS 124 may be a read only memory and may be equipped with addressable areas including area 211 which contains VBE/DDC instructions and the like. It will be appreciated that the VBE/DDC instructions may be contained in other areas of computer system 110 but are preferably located in the BIOS ROM such as BIOS 124. Processor 121, in loading information from BIOS 124, loads the VBE/DDC instructions or pointers to other memory space where the instructions are located, from area 211. It should be noted that VBE functions are preferably called using the INT 10h interrupt vector, passing arguments in, for example, the 80×86 registers, if processor 121 is an Intel® processor. The INT 10h interrupt handler first determines if a VBE function has been requested, and if so, processes that request. Otherwise control is passed to the standard VGA BIOS for completion. All VBE functions are called with the AH register set to 4Fh to distinguish them from the standard VGA BIOS functions. The AL register is used to indicate which VBE function is to be performed. For supplemental or extended functionality the BL register is used when appropriate to indicate a specific sub-function. In addition to the INT 10h interface, a Protected Mode Interface or other interface may also be used. The AX register is used to indicate the completion status upon return from VBE functions. If VBE support for the specified function is available, the 4Fh value passed in the AH register on entry is returned in the AL register. If the VBE function completed successfully, 00h is returned in the AH register. Otherwise the AH register is set to indicate the nature of the failure. Since the above described operations are well known to those of ordinary skill in the art, they have not been shown in the drawings.

As described above, processor 121 may issue display related instructions such as READ EDID commands 331 and 332 to standard VGA circuit 123 and graphics adapter 122 respectively. If either or both ports have displays connected thereto, then a data structure associated with the EDID command will be filled with information about the display such as its capabilities and the like. However, the fact that EDID data structure is filled with information provides and indication that a display is connected whereas the lack of information regarding a display will provide an indication that no display is connected. Thus in exemplary scenario 300 it can be seen that display 101 is connected to graphics adapter 122. Again, if computer system 110 is configured such that standard VGA circuit 123 is the default display driver, then no display will be visible. EDID data 233 from READ EDID command 232 issued graphics adapter 122 indicates that the display is connected thereto, and correspondingly, the lack of EDID data for READ EDID command 21 issued standard VGA circuit 123 indicates that no display or an incompatible, undefined, or inoperable display is connected thereto.

Figure 4:
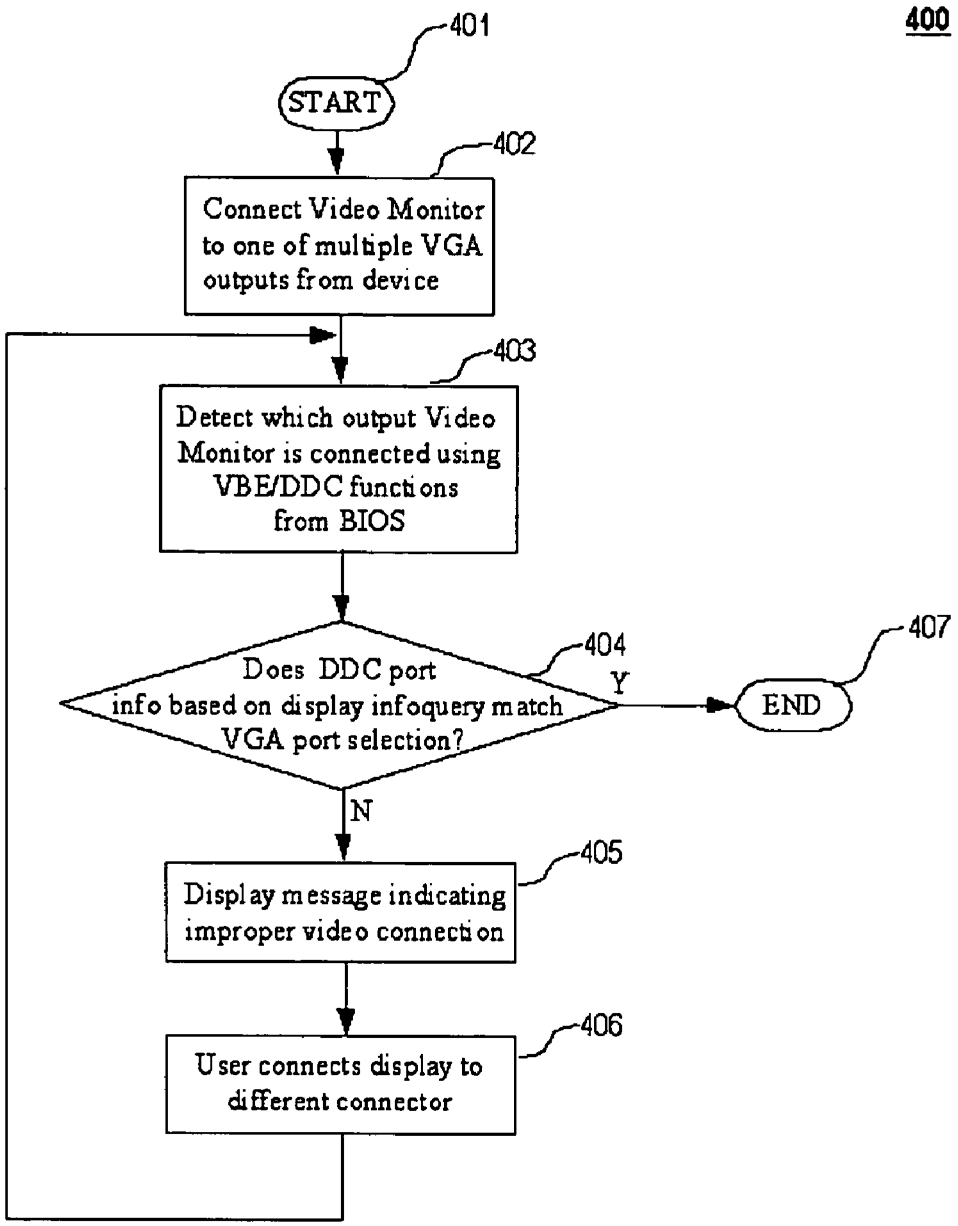
FIG. 4 is a flow chart illustrating exemplary procedures associated with various embodiments of the inventive method.

In accordance with exemplary process 400 shown in FIG. 4, after start at 401, a monitor such as display 101 may be connected at 402 to computer system 110 on one of the multiple VGA outputs such as connectors 111-114 noted above. At 403 the output port to which the monitor such as display 101 is connected can be detected using, for example, a display related instruction such as the READ EDID command as described above. At 404 a test can be performed to determine whether the output port to which a connection with a display is detected matches the default or configured display port for the system. If the display connection is not detected at the proper port, then the port to which the display is connected can be initialized and used to display an error message, a message indicating the change in default port, or the like at 405. The user may further connect the display to a different connector at 406 and the process can return to 403. If the display connection is detected at the proper port, the process can simply terminate at 407.

It is believed that the method of the present invention and many of its attendant advantages will be understood by the forgoing description. It is also believed that it will be apparent that various changes may be made in the form, construction and arrangement of the processes and steps associated therewith without departing from the scope and spirit of the invention or without sacrificing all of its material advantages. The form herein before described being merely an explanatory embodiment thereof. It is the intention of the following claims to encompass and include such changes.

What is claimed is:

1. A method for detecting a connection between a system and a display of the system, wherein the systems has at least a first video output port and a second video output port, the method comprising:

connecting the display to one of either the first video output port or the second video output port, wherein the first video output port is a default port for connection of the display;

reading information over a data channel, the information associated with the first video output port and the second video output port;

detecting an absence of a connection between the display and the first video output port; and transferring information associated with the absence of the connection between the display and the first video output port, said information being transferred to the display connected to the second video output port so as to display the transferred information associated with the absence of the connection.

2. The method according to claim 1, wherein the data channel includes a VESA BIOS Extension/Display Data Channel (VBE/DDC).

3. The method according to claim 2, wherein the reading the data channel information includes sending an EDID read command to each of the first video output port and the second video output port.

4. The method according to claim 3, wherein the detecting the absence of the connection includes detecting that the EDID read command did not result in EDID information associated with the display from the first video output port.

5. The method according to claim 2, wherein the detecting the absence of the connection includes detecting that a response to an EDID read command did not result in EDID information associated with the display from the first video output port.

6. An apparatus for detecting a connection between a display of a system and one of either a first video output port or a second video output port capable of communicating with the display over a data channel, the first video output port being a default port for connection of the display, and a Basic Input Output System (BIOS) memory, the apparatus comprising:

a processor coupled to the BIOS memory, the first video output port, and the second video output port; and a memory coupled to the processor, the memory storing instructions for causing the processor to:

load display related instructions from the BIOS memory;

execute the display related instructions so as to:

read information over the data channel associated with the first video output port and the second video output port;

detect an absence of a connection between the display and the first video output port based on the information; and transfer the information associated with the absence of the connection between the display and the first video output port, said information being transferred to the display connected to the second video output port so as to display the transferred information associated with the absence of the connection.

7. The apparatus according to claim 6, wherein the data channel includes a Display Data Channel (DDC).

8. The apparatus according to claim 6, wherein the display related instructions include VESA BIOS Extension (VBE) instructions.

9. The apparatus according to claim 7, wherein the processor in reading the data channel information is further configured to send an EDID read command to each of the first video output port and the second video output port.

10. The apparatus according to claim 9, wherein the processor, in detecting the absence of the connection, is further configured to detect that the EDID read command did not result in EDID information associated with the display from the first video output port.

11. The apparatus according to claim 7, wherein the processor, in detecting the absence of the connection, is further configured to detect that a response to an EDID read command did not result in EDID information associated with the display from the first video output port.

12. An article of manufacture comprising:

a computer readable medium; and instructions of a computer executable program encoded on the computer readable medium, the instructions capable of being read by a processor in a computer system having a display, at least a first video output port and a second video output port capable of communicating with the display over a data channel, the instructions for causing the processor to:

load display related instructions from a BIOS memory associated with the computer system;

execute the display related instructions so as to:

read information over the data channel associated with the first video output port and the second video output port;

detect a connection of the display to one of either the first video output port or the second video output port, wherein the first video output port is a default port for connection of the display;

detect an absence of a connection between the display and the first video output port based on the information; and transfer the information associated with the absence of the connection between the display and the first video output port, said information being transferred to the display connected to the second video output port so as to display the transferred information associated with the absence of the connection.

13. The article of manufacture according to claim 12, wherein the data channel includes a Display Data Channel (DDC).

14. The article of manufacture according to claim 12, wherein the display related instructions include VESA BIOS Extension (VBE) instructions.

15. The article of manufacture according to claim 13, wherein the instructions, in causing the processor to read the data channel information further cause the processor to send an EDID read command to each of the first video output port and the second video output port.

16. The article of manufacture according to claim 15, wherein the instructions, in causing the processor to detect the absence of the connection further cause the processor to detect that the EDID read command did not result in EDID information associated with the display from the first video output port.

17. The article of manufacture according to claim 13, wherein the instructions, in causing the processor to detect the absence of the connection further cause the processor to detect that a response to an EDID read command did not result in EDID information associated with the display from the first video output port.

18. The article of manufacture according to claim 12, wherein the computer readable medium includes one of an optical disk, a floppy disk, a wireless signal, a network, and a Read Only Memory (ROM).

19. The method according to claim 1, wherein said information read over the data channel is from the display.

20. The apparatus according to claim 6, wherein said information read over the data channel is from the display.

21. The article of manufacture according to claim 12, wherein said information read over the data channel is from the display.

22. The method according to claim 1, further comprising:

initializing the second video output port in response to said detecting of the absence of the connection between the display and the first video output port.

23. The apparatus according to claim 6, the executing of the display related instructions further comprising:

initialize the second video output port in response to said detecting of the absence of the connection between the display and the first video output port.

24. The article of manufacture according to claim 12, the executing of the display related instructions further comprising:

initialize the second video output port in response to said detecting of the absence of the connection between the display and the first video output port.

* * * * *